United States Patent
Borra et al.

(10) Patent No.: US 11,531,554 B2
(45) Date of Patent: Dec. 20, 2022

(54) AUTOMATED HIERARCHICAL TUNING OF CONFIGURATION PARAMETERS FOR A MULTI-LAYER SERVICE

(71) Applicant: salesforce.com, inc., San Francisco, CA (US)

(72) Inventors: Ajay Krishna Borra, Telangana (IN); Himanshu Mittal, Telangana (IN); Metarya Ruparel, Gujarat (IN); Ravi Teja Pothana, Telangana (IN); Manpreet Singh, Telangana (IN)

(73) Assignee: salesforce.com, inc., San Francisco, CA (US)

( * ) Notice: Subject to any disclaimer, the term of this patent is extended or adjusted under 35 U.S.C. 154(b) by 306 days.

(21) Appl. No.: 16/709,445

(22) Filed: Dec. 10, 2019

(65) Prior Publication Data

US 2021/0173670 A1   Jun. 10, 2021

(51) Int. Cl.

| | |
|---|---|
| *G06F 9/445* | (2018.01) |
| *G06F 11/36* | (2006.01) |
| *G06F 9/455* | (2018.01) |
| *G06F 16/901* | (2019.01) |

(52) U.S. Cl.
CPC ...... *G06F 9/44505* (2013.01); *G06F 9/45558* (2013.01); *G06F 11/3664* (2013.01); *G06F 16/9024* (2019.01)

(58) Field of Classification Search
CPC ............. G06F 16/9024; G06F 9/45558; G06F 2009/45595; G06F 9/4881; G06F 9/5038; G06F 9/505; G06F 11/3409; G06F 11/3466; G06F 11/3664; G06F 9/44505; G06F 2201/88; G06F 2201/81; H04L 41/5019; H04L 45/22; H04L 41/0654; H04L 41/0668; H04L 41/0813; H04L 41/0873; H04L 41/12; H04L 41/145
USPC ........................................................ 713/100
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |

(Continued)

*Primary Examiner* — Faisal M Zaman
(74) *Attorney, Agent, or Firm* — Kwan & Olynick LLP

(57) ABSTRACT

Example implementations relate to performing automated hierarchical configuration tuning for a multi-layer service. According to an example, a service definition and optimization criteria are received for tuning a configuration of a service. The service definition includes information regarding multiple of layers of the service and corresponding configuration groups. An acyclic dependency graph is created including nodes representing each of the of layers and each of the corresponding configuration groups. Configuration parameters of the configuration groups are globally optimized by creating an instance of the service within a test environment based on the service definition; and performing a local optimization process based on the optimization criteria at each layer of the instance of the service by passing identified optimized values of configuration parameters for a particular layer on to parent layers as defined by the acyclic dependency graph and propagating the identified optimized values through the dependency graph.

20 Claims, 12 Drawing Sheets

(56) References Cited

U.S. PATENT DOCUMENTS

| | | |
|---|---|---|
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,640,015 B1 * | 10/2003 | Lafruit .................. H04N 19/42 708/401 |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 7,839,849 B1 * | 11/2010 | Attig ...................... H04L 69/22 370/389 |
| 10,417,058 B1 * | 9/2019 | Kesler ..................... G06F 9/448 |
| 10,599,612 B1 * | 3/2020 | Gralnick ............... G06F 16/252 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0177744 A1 | 7/2009 | Marlow et al. |
| 2011/0185346 A1 * | 7/2011 | Andrade .................. G06F 8/60 717/136 |
| 2017/0093639 A1 * | 3/2017 | Dabbagh ................. H04L 43/08 |
| 2017/0371709 A1 * | 12/2017 | Harper .................. G06F 9/5038 |
| 2017/0371870 A1 * | 12/2017 | Eck .......................... G06F 40/51 |
| 2018/0136912 A1 * | 5/2018 | Venkataramani ........ G06N 3/04 |
| 2018/0137413 A1 * | 5/2018 | Li .......................... G06N 3/0481 |
| 2018/0165603 A1 * | 6/2018 | Van Seijen ............ G06N 3/084 |
| 2019/0197669 A1 * | 6/2019 | Sakamoto ............. G06V 20/647 |
| 2020/0053116 A1 * | 2/2020 | Soroush ............... H04L 43/045 |
| 2021/0073343 A1 * | 3/2021 | Musante ............... G06F 30/327 |

* cited by examiner

AUTOMATED HIERARCHICAL TUNING OF CONFIGURATION PARAMETERS FOR A MULTI-LAYER SERVICE

BACKGROUND

Field

Embodiments of the present disclosure generally relate to web/micro services and configuration tuning. In particular, embodiments of the present disclosure relate to an automated and hierarchical approach for tuning of configuration parameters for a multi-layer service to meet specified optimization goals.

Description of the Related Art

Web/micro services include a number of configuration parameters that dictate the service performance. Optimizing these parameters appropriately can result in large performance gains and can reduce the overall cost of running the service. Currently, these configurations are set manually based on a trial and error approach based on extensive performance testing by engineering teams. This manual trial and error approach leads to numerous issues. For example, due to the complexity of identifying optimal configurations, customers may optimize the configuration of each service tier in isolation without considering the impact on other service tiers. Additionally, configuration parameters may become obsolete over time as a result of changes to underlying hardware and/or software resources associated with the production environment. Furthermore, software and/or hardware differences between test and production environments may result in configurations that are suboptimal. Alternatively, customers end up with end up with one-size-fits-all configurations by assuming parameters for one environment are sufficient for another environment or may not tune most of the configuration parameters and simply leave them at their defaults.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1:
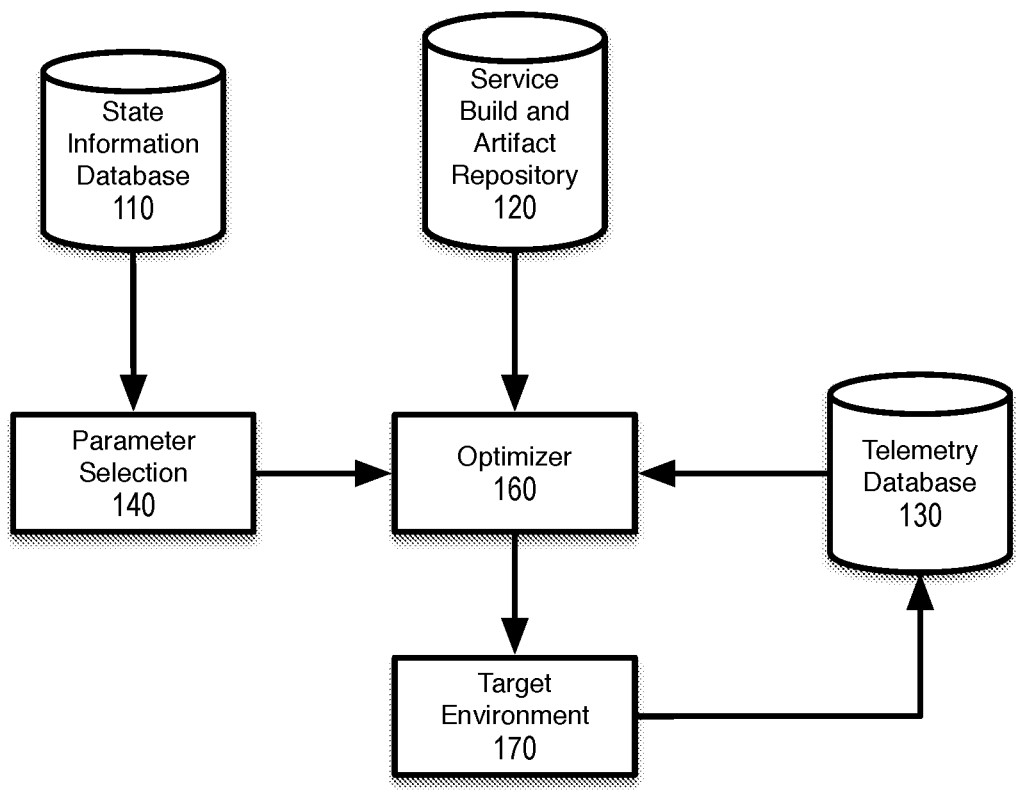
FIG. 1 is a block diagram depicting a service configuration tuning architecture in accordance with an embodiment.

Systems and methods are described for performing automated hierarchical configuration tuning for a multi-layer service. In the following description, numerous specific details are set forth in order to provide a thorough understanding of example embodiments. It will be apparent, however, to one skilled in the art that embodiments described herein may be practiced without some of these specific details. In other instances, well-known structures and devices are shown in block diagram form.

Embodiments described herein seek to address various of the above shortcomings described above by, among other things, reducing the complexity of the optimization problem by orders of magnitude. According to one embodiment, the exploration search space to find minima/maxima of the hyperplane represented by the configuration parameters of the multi-layer service at issue is reduced by filtering out those of the configuration parameters that do not contribute significantly to the overall optimization goal. For example, the parameters can be subjected to statistical analysis and those that do not impact the optimization goal by a predefined or configurable threshold can be dropped from further consideration.

Additionally, the hierarchical structure of the multi-layer service and associated configuration groups may be maintained to preserve the sequencing nature of the optimization iterations by creating an acyclic dependency graph including the layers of the multi-layer service and the corresponding configuration groups. In one embodiment, a globally optimal set of values for the relevant configuration parameters are identified based on specified optimization criteria by iteratively performing a local optimization process at each layer of an instance of the multi-layer service at issue created within a test environment. The identified optimized values identified at a particular layer can be propagated up the hierarchy based on the dependency graph until global optima are identified.

In one embodiment, the optimization process is a bi-directional process in which a failure to achieve the goal specified by the optimization criteria at the parent layer based on a particular identified local minimum/maximum of multiple local minima/maxima at the child layer causes a reevaluation to be performed at the child layer to identify an alternative local minimum/maximum from among the multiple local minima/maxima.

According to one embodiment, the hierarchical optimization process is repeated until the global goal is achieved by tracking a change in a performance metric from iteration to iteration and if the change in the value of the performance metric does not meet a saturation threshold for a predefined or configurable number of runs, the process is terminated (as at this point a saturation point has been reached at which no further improvements in the performance metric are expected to be observed).

Terminology

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

The phrase "configuration parameter" generally refers to a parameter associated with a software component, a hardware component or a virtual hardware component that may be used to tune the performance of the component at issue. The parameter may be a direct parameter or a derived parameter of the directly available parameters. A non-limiting example of a software component parameter is a configuration parameter of a Micro/Web service. A non-limiting example of a hardware component-related parameter is Network Interface Card (NIC) speed. Non-limiting examples of virtual hardware component parameters include virtual core count and vCPU thread counts. In one embodiment, each of the parameters are also associated with metadata that describe the values the parameters can take on. For example, the metadata may be of categorical nature and take on values like ['ABC', 'LMN', 'XYZ', . . . ] or the metadata may represent a range of continuous values (e.g., [−infinity to +infinity], [50 to 100]). Non-limiting examples of configuration parameters include network configuration parameters (e.g., maximum transmission unit (MTU), transmission control protocol (TCP) segment size, TCP timeout, TCP send buffer size, TCP receive buffer size, and the like), database configuration parameters (e.g., storage engine, maximum number of connections, audit buffer size, number of worker threads, transport method, maximum query degree, and the like), operating system configuration parameters (e.g., disk block size, filesystem, scheduler, memory, swap space, system open file limits, address space limits, file size limits, user process limits, disk readahead, and the like), Java virtual machine (JVM) configuration parameters (e.g., code cache size, garbage collection, heap size, and the like), and the like.

The phrase "optimization criteria" generally refers to information and/or parameters associated with evaluating an optimization goal. In the context of various embodiments described herein an optimization goal may be specified by a customer of a web/micro service with reference to optimization criteria. Non-limiting examples of optimization criteria include one or more conditions (e.g., maximizing or minimizing) relating to a particular performance metric or a group of performance metrics, optimization metadata that specifies an optimization algorithm to be used, and optimization parameters that control the behavior of the specified optimization algorithm. Depending upon the particular implementation, optimization criteria may be stored on a per-customer and/or per-web/micro service basis. While for sake of brevity, various examples described herein are described with reference to an optimization goal of maximizing or minimizing a particular performance metric, those skilled in the art will appreciate the methodologies described herein are equally applicable to an optimization goal that includes multiple performance metrics and other conditions.

A "performance metric" generally refers to a metric relating to the performance of an application or service that is capable of being queried, measured or otherwise observed. Non-limiting examples of performance metrics include Quality of Service (QoS) metrics (e.g., packet loss, bit rate, error rates, throughput, transmission delay, delay variation, availability, jitter, and the like), Service Level Agreement (SLA) metrics (e.g., query response time, service availability, defect rates, security performance, data rates, throughput, jitter, mean time between failures, mean time to repair, mean time to recovery, and the like) or other application or service performance metrics (e.g., average response time, error rates, count of application instances, request rate, application CPU usage, application availability, garbage collection, number of concurrent users, and the like).

A "service definition" generally refers to information about service layering, configuration information and/or versions of services and/or configuration information. In various embodiments described herein services may include multiple layers (e.g., an application layer, a database layer, a search layer, a caching layer, and the like) that implement particular sets of functionality and each layer of a service may have multiple configuration groups. According to one embodiment, the service definition also include information identifying dependency information, for example, dependencies among the multiple layers.

A "configuration group" generally refers to a set of configurations. Non-limiting examples of a configuration group include a group of one or more of a set of operating system configuration parameters, a set of network configuration parameters, a set of JMV configuration parameters, a set of database configuration parameters, a set of search index configuration parameters, and the like.

Architecture Overview

FIG. 1 is a block diagram depicting a service configuration tuning architecture 100 in accordance with an embodiment. In the context of the present example, the service configuration tuning architecture 100 includes a state information database 110, a service and artifact repository 120, a telemetry database 130, a parameter selection module 140, an optimizer 160, and a target environment 170. In one embodiment, the service configuration tuning architecture 100 may be used as an internal tool on behalf of a cloud-based software company to perform configuration tuning on behalf of their customers. For example, the cloud-base software company may provide a multi-tenant, computing environment in which customers (tenants) run various services including one developed by the cloud-based software company in the form of a customer relationship management solution or an on-demand database service, for example. Alternatively, the service configuration tuning architecture 100 may be provided as a service itself to allow the end users of various services to obtain configuration parameter tuning recommendations. While for purposes of providing a concrete example, various embodiments are described herein with reference to a particular type of service and a particular computing environment through which the service might be made available to end users, those skilled in the art will appreciate the methodologies described herein are equally applicable to public, private and hybrid cloud environments as well as other types of services.

According to one embodiment, the state information database 110 represents a storage layer of the service configuration tuning architecture 100. The state information database 100 may be used to keep track of the state information used for performing configuration optimizations for various service builds in various target environments. Non-limiting examples of dimensions that may be represented within the state information database 100 to achieve the hierarchal optimizations described herein include service definitions and corresponding optimization criteria on a per-customer and/or per-service basis.

A service definition for a particular service may include information about service layering, configuration groups, and versions associated with the service and/or its associated configuration groups. In various embodiments described herein, each service may have multiple layers and each layer may have multiple configuration groups. For example, a service (e.g., a customer relationship management solution) may have an application layer, a database layer and a search layer. According to one embodiment, a configuration group represents the various configuration parameters for a particular layer of a service for which values may be configured. A configuration group may include configuration parameters associated with one or more underlying resources (e.g., virtual or physical computer resources or software tools) upon which the service relies. Non-limiting examples of configuration parameters that may be part of a configuration group include operating system configuration parameters, network configuration parameters, JVM configuration parameters, and database configuration parameters.

Optimization criteria generally relate to information associated with evaluation of an optimization goal. According to one embodiment, customers may specify their optimization goals with reference to maximizing or minimizing a particular performance metric (e.g., query response time or service availability) and/or a group of performance metrics along with corresponding optimization metadata, including the optimization algorithm to be used and optimization parameters that control the behavior of the optimization algorithm. Those skilled in the art will appreciate there are a number of optimization algorithms, including Bayesian optimization and conjugate gradients, that may be employed. In alternative embodiments, the optimization algorithm may not be a parameter of the optimization criteria and may instead be programmatically selected based on the nature of a filtered set of configuration parameters that will be the subject of the hierarchical optimization process. As described further below, in one embodiment based on a service definition for a service at issue for which configuration tuning is to be performed including information regarding its layers and their respective configuration groups, the configurations are represented as part of an acyclic dependency group of configurations with each configuration group connected to its respective layer and each layer connected to dependency layers. The graph structure may then be used to navigate through each configuration group and run a local optimization and ultimately a global optimization as explained further below.

The parameter selection module 140 may be used to select an appropriate subset of all of the configuration parameters represented collectively by the configuration groups associated with each layer of the service at issue. Typically, each layer of the service will have a set of parameters (the configuration group) that can be configured to allow the user of the service to optimize the service in accordance with their particular goals. Some of these parameters, however, will not contribute sufficiently to certain optimization goals to be worthy of including them in the configuration tuning optimization process. As such, according to one embodiment, an initial parameter section process is performed by the parameter selection module 140 to filter out such non-contributing configuration parameters or configuration parameters that make a negligible contribution to the specified optimization goal. In this manner the set of parameters to be considered by the optimization process is reduced, thereby reducing the complexity of the optimization process and the time to produce optimization results.

As noted above, in one embodiment, a statistical approach can be used to determine whether to retain or drop a particular configuration parameter. For example, as described further below, one way to determine the validity of a configuration parameter is to isolate the configuration parameter and test it independently of the other configuration parameters. In this manner, the problem can be simplified to a single dimension, thereby avoiding the combinatorial evaluation and also allowing the testing process to be parallelized using multiple threads at the same time, for example. It is common for discrete/continuous domain parameters to be used to compose optimization goals. Based on the nature of the configuration parameters at issue, in one embodiment, near equispaced combinations of a parameter hyperplane can be generated and tests can be run on the parameter hyperplane to check the contribution of each parameter towards the specified optimization goal. Assume, a particular configuration parameter has been isolated and it has been found that it is a continuous parameter with range [1 to 1000] from parameter metadata, for example. According to one embodiment, since the configuration parameter at issue is a continuous attribute with 1-dimensional continuous range, a statistical/mathematical approach called sobol sequence may be used to deterministically choose a fairly even distribution of points in the range of [1 to 1000]. Then, these chosen points can be used run the tests and find out the worthiness of the configuration parameter's contributions to the overall optimization. As described in further detail below, in one embodiment, the parameters that do not provide a configurable threshold level of contribution to the optimization goal are dropped from the local and global optimization scope.

While the example described above is provided with reference to a particular type of statistical/mathematical approach and with reference to a continuous configuration parameter, those skilled in the art will appreciate the methodologies described herein are equally applicable to categorical configuration parameters and other statistical approaches. For example, in the context of a categorical configuration parameter a different statistical approach may be used. Non-limiting examples of statistical methods that may be used include Sobol's sequence based method, chi-square, and Laplace's method.

As described in further detail below with reference to FIGS. 3-5, the role of the optimizer 160 is to pick each layer of the multi-layer service and pass on the optimized parameters from the dependent layers to the parent layer, so that optimization on the most rudimentary layer results in optimizing the entire service. In the context of the present example, the optimization process performed by the optimizer 160 is influenced by the parameter selection module 140. For example, in one embodiment, the hierarchical optimization process performed by the optimizer 160 can be simplified by considering only those of the parameters selected by the parameter selection module 140. The optimization process may also be dependent upon input from the service build and artifact repository 120, which in accordance with an embodiment allows the optimizer 160 to create an instance of the service that matches the customer's service build and run it within a target environment that matches the customer's production environment. The optimization process may also receive feedback from the telemetry database 130, which captures values of configuration parameters and corresponding values of performance metrics as the optimization process is being performed.

The service build and artifact repository 120 contains all the versions of software builds desired to be emulated as well as their respective dependencies. According to one embodiment, the service build and artifact repository 120 may include zip files, docker images, and jar files, for example, of software that can be used to compose the layers for the service definitions in the state information database 110. This allows the service provider operating the service configuration tuning architecture to provide configuration tuning recommendations to a variety of customers that may be using different builds and/or versions of the service at issue. According to one embodiment, the service builds are run within the target environment 170 and used by the optimizer 160 for running tests so as to allow desired performance metrics to be captured during the optimization phases and be used as part of a feedback loop to improve on the optimization goals in an iterative manner and associate the best configurations for particular combinations of the builds.

The target environment 170 should resemble the customer's production environment in which the service at issue is being run or will be run. According to one embodiment a Pod (e.g., a Kubernetes Pod) is the basic unit of deployment for a service. For example, a Pod may encapsulate an application's container (or, in some cases, multiple containers), storage resources as well as the options that govern how the container(s) should run. A Pod can represent a single instance of an application, which might consist of either a single container (e.g., a Docker container) or a small number of containers that are tightly coupled and that share resources. According to one embodiment, based on the end goal(s) and the configuration groups defined in the state information database 110 an appropriate target environment 170 is spawned by the optimizer 160 and optimization/performance metrics are captured and pushed to the telemetry database 130. In one embodiment, the optimizer 160 spawns these environments with different updated configuration groups as it optimizes the environment toward the end goal(s).

According to one embodiment, the telemetry database 130 stores the captured performance metric values and configuration settings used for the various test runs. These values can then be used as part of a feedback loop to the optimizer 160 to tune the configuration settings further.

Parameter Selection

Figure 2A:
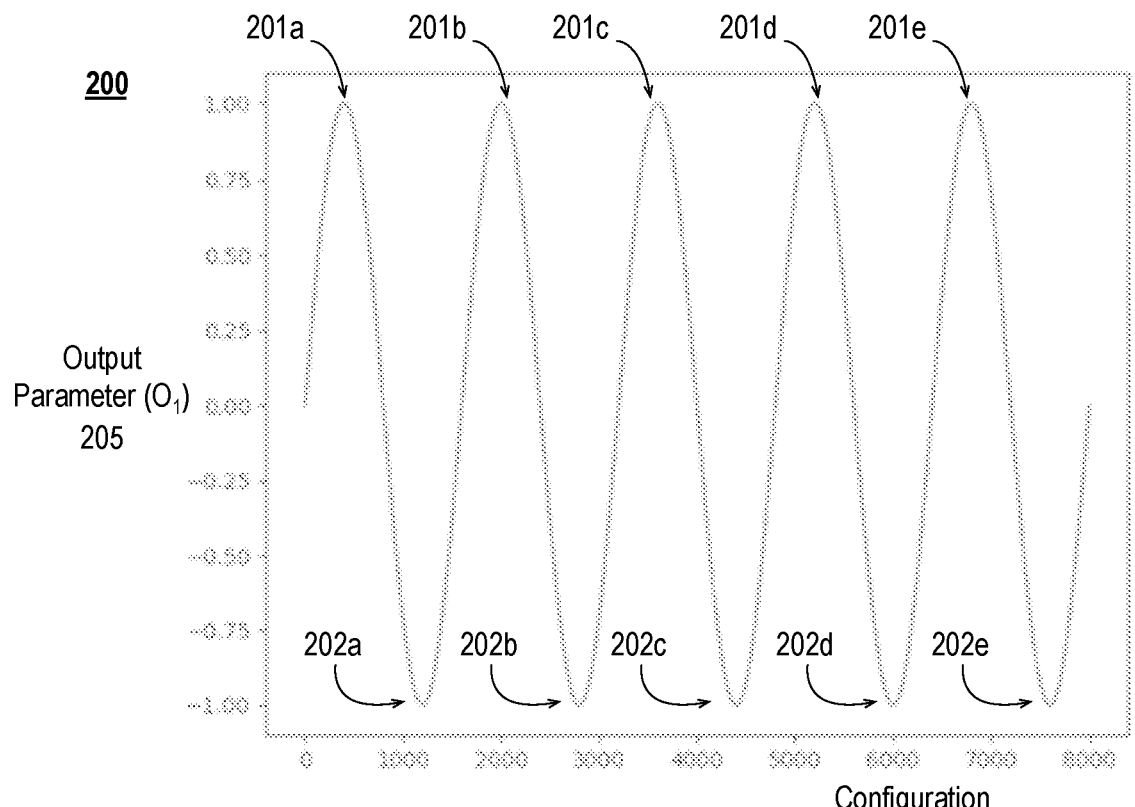
FIGS. 2A and 2B are graphs illustrating the relationship between two different configuration parameters and an output configuration parameter.
Figure 2B:
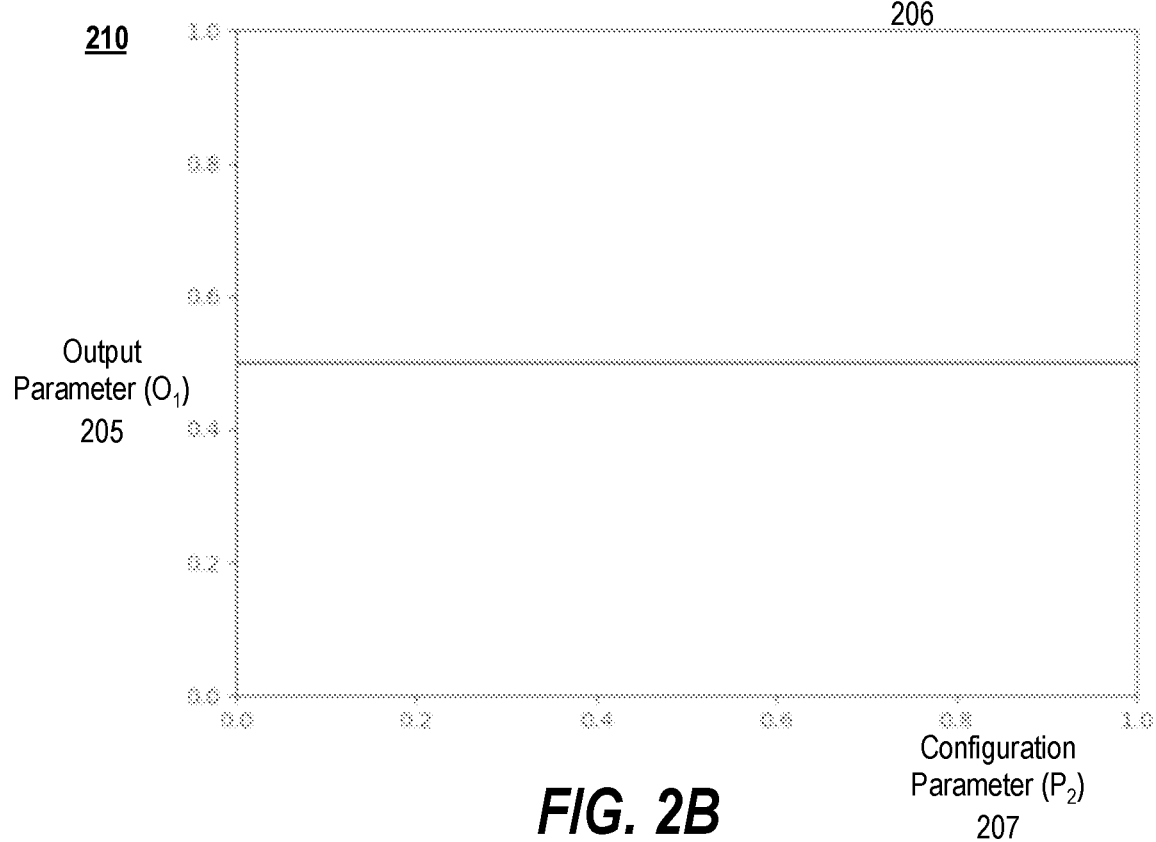

FIGS. 2A and 2B are graphs illustrating the relationship between two different configuration parameters and an output configuration parameter. As noted above, in one embodiment, a parameter selection process is performed to filter out parameters that do not make a configurable threshold level of impact on the optimization goal (e.g., minimizing query response time) so as to reduce the number of configuration parameters considered by the optimization process. For example, an instance of the service can be created within the target environment 170 and the target performance metric (e.g., query response time) can be captured for each test case represented by a particular combination of configuration parameter values (each representing a specific configuration) as dictated by the generated parameter hyperplane. As those skilled in the art will appreciate, a subset of these configurations will involve maintaining a constant value for all but one configuration parameter, thereby allowing a determination of its contribution independent of the others. According to one embodiment, this single-varying configuration parameter scenario may be represented within the generated parameter hyperplane multiple times for each configuration parameter with different constant values being maintained for the other configuration parameters. In this manner, statistical analysis can then be performed on the various configurations and the observed result on the target performance metric to quantify an average, mean, minimum, maximum or other statistical measure of the contribution of each of configuration parameters. This measure of contribution for each of the configuration parameters may then be compared to a predefined or configurable threshold to filter out those found not to contribute sufficiently to the optimization goal to include them in the subsequent optimization processing.

For purposes of illustration, assume a set of two configuration parameters ($P_1$ and $P_2$) represent the configuration group for a particular layer of the service at issue and the relationship between the set of configuration parameters and an output parameter (e.g., a target performance metric) is represented by the following equation:

$$P_1 \times P_2 = O_1$$

Turning now to FIG. 2A, it represents an example of a single-varying configuration parameter scenario discussed above and illustrates how $O_1$ responds to changes in the value of $P_1$ as $P_2$ is held constant. As can be seen in FIG. 2A, $O_1$ has a number of local maxima 201a-e and a number of local minima 202a-e. Assuming the variability of $O_1$ is sufficient to meet the configurable threshold, this is the type of configuration parameter that would be maintained by the parameter selection process for inclusion in subsequent optimization processing.

Referring now to FIG. 2B, it represents another example of a single-varying configuration parameter scenario discussed above and illustrates how $O_1$ responds to changes in the value of $P_2$ as $P_1$ is held constant. As can be seen in FIG. 2B, the value of $O_1$ remains constant for the range of values of $P_2$ tested. This means that fining a local maxima/minima on this parameter will be futile (as it has a slope of zero). This is an extreme example of the type of configuration parameter that should be filtered out as part of the parameter selection process./

While this the above example has been described with reference to only two configuration parameters, those skilled in the art will appreciate it is extensible to a greater number of configuration parameters.

Hierarchical, Bi-Directional Parameter Passing

Figure 3:
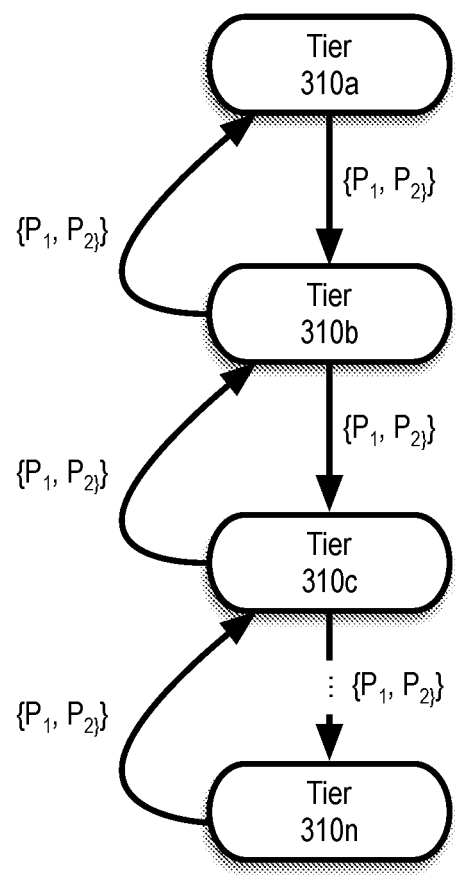
FIG. 3 is a block diagram conceptually illustrating the hierarchical and bi-directional nature of the passing of parameter configurations between layers of a multi-layer service during an iteration of a parameter optimization process in accordance with an embodiment.

FIG. 3 is a block diagram conceptually illustrating the hierarchical and bi-directional nature of the passing of parameter configurations between layers of a multi-layer service during an iteration of a parameter optimization process in accordance with an embodiment. In the context of the present example, the multi-layer service for which tuning of configuration parameters is to be performed includes n tiers (layers) $310a$-$n$. Those skilled in the art will appreciate any differential plane as a whole will have a single global maximum/minimum, but when split into fragments (e.g., by way of tiers $310a$-$n$) it will have multiple local maxima/minima. The global maximum/minimum is a subset of these local maxima/minima.

In embodiments described herein, as part of the optimization process, a particular tier $310a$-$n$ is selected and optimized for minima/maxima based on the optimization goal. The resulting configuration parameter values (e.g., $P_1$ and $P_2$) are passed to each parent layer until the global optima is identified. As can be seen with reference to FIG. 3, this is a bi-directional process. For example, if at any layer of the service, the optimization goal cannot be achieved, then the parameters are passed back through the child layers (so that the same set of parameter values is not reused) and the optimization process is rerun from the initial layer. This process is repeated until the global optimization goal has been achieved. For a particular iteration of the optimization process in which the local optimal parameter values also represent local optimal parameter values at each subsequent layer, then the global maximum/minimum has been found.

Automated Hierarchical Configuration Parameter Tuning

Figure 4:
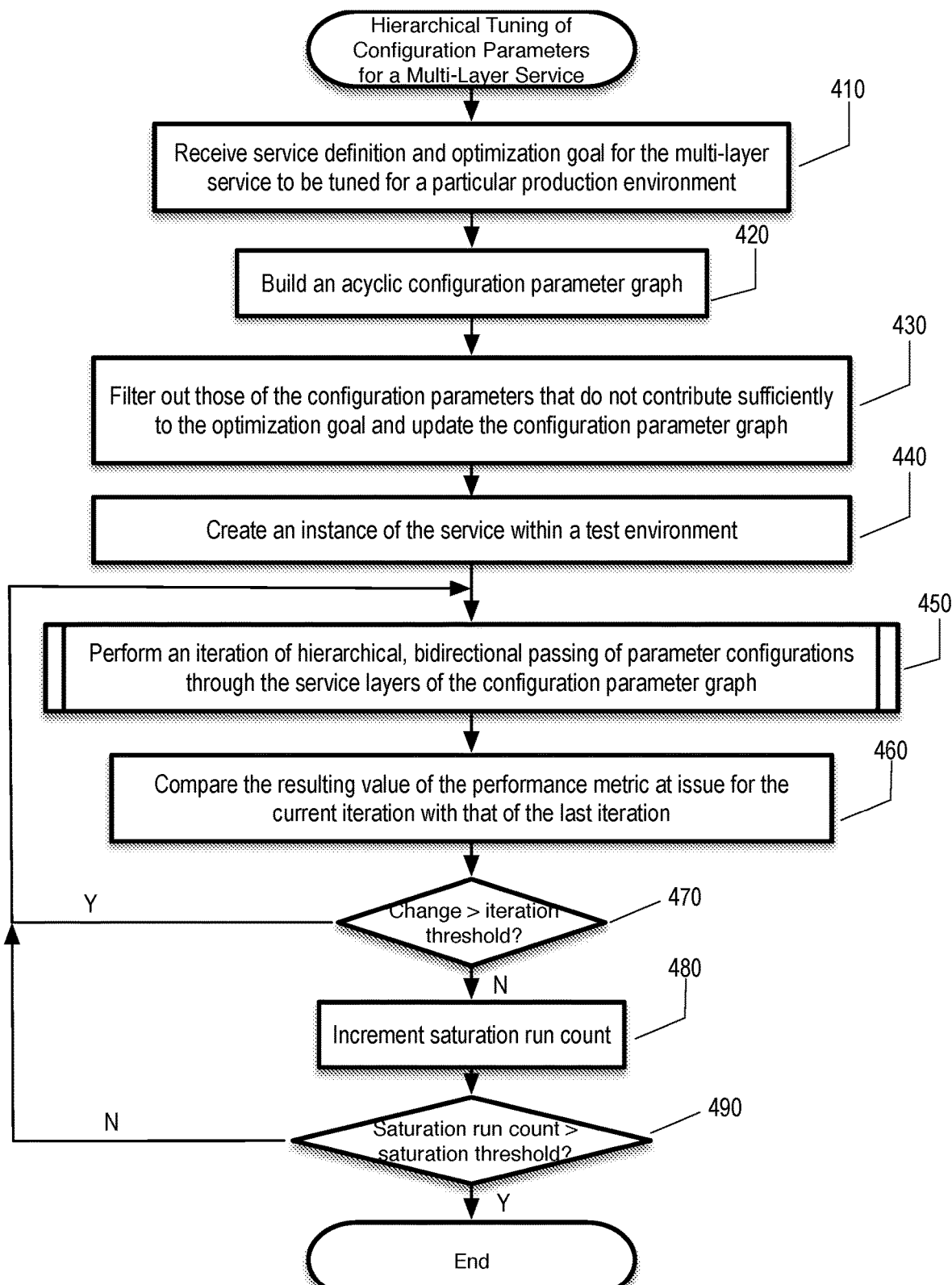
FIG. 4 is a flow diagram illustrating an automated process for performing hierarchical tuning of configuration parameters for a multi-layer service in accordance with an embodiment.

FIG. 4 is a flow diagram illustrating an automated process for performing hierarchical tuning of configuration parameters for a multi-layer service in accordance with an embodiment. The processing described with reference to FIG. 4 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, this processing may be performed by one or more physical or virtual computer systems, such as computer system 900 illustrated in FIG. 9.

At block 410, a service definition and an optimization goal for the resulting configuration of the multi-layer service to be tuned is received. The general idea here is to gather sufficient information regarding the configuration parameters involved and the customer's optimization goal for the service. As such, more or less information may be gathered depending upon whether the service for which configuration tuning is being performed is a service offered by a third party or one provided by the service provider operating the service configuration tuning service.

According to one embodiment, the service definition and the optimization goal are retrieved from a state information database (e.g., state information database 110) that has been previously populated by or with the input from the customer or user of the service at issue. In alternative embodiments, some subset of all of the information associated with the service definition and the optimization goal may be input by the operator of the service configuration tuning service at or near the time of performing the configuration tuning via a graphical user interface, for example. As noted above, the service definition may provide information regarding the number and types of layers of the multi-layer service at issue. The service definition may also include information regarding configuration groups associated with each layer of the multi-layer service. In addition, the service definition may specify a version of the multi-layer service and/or the configuration groups.

Figure 6A:
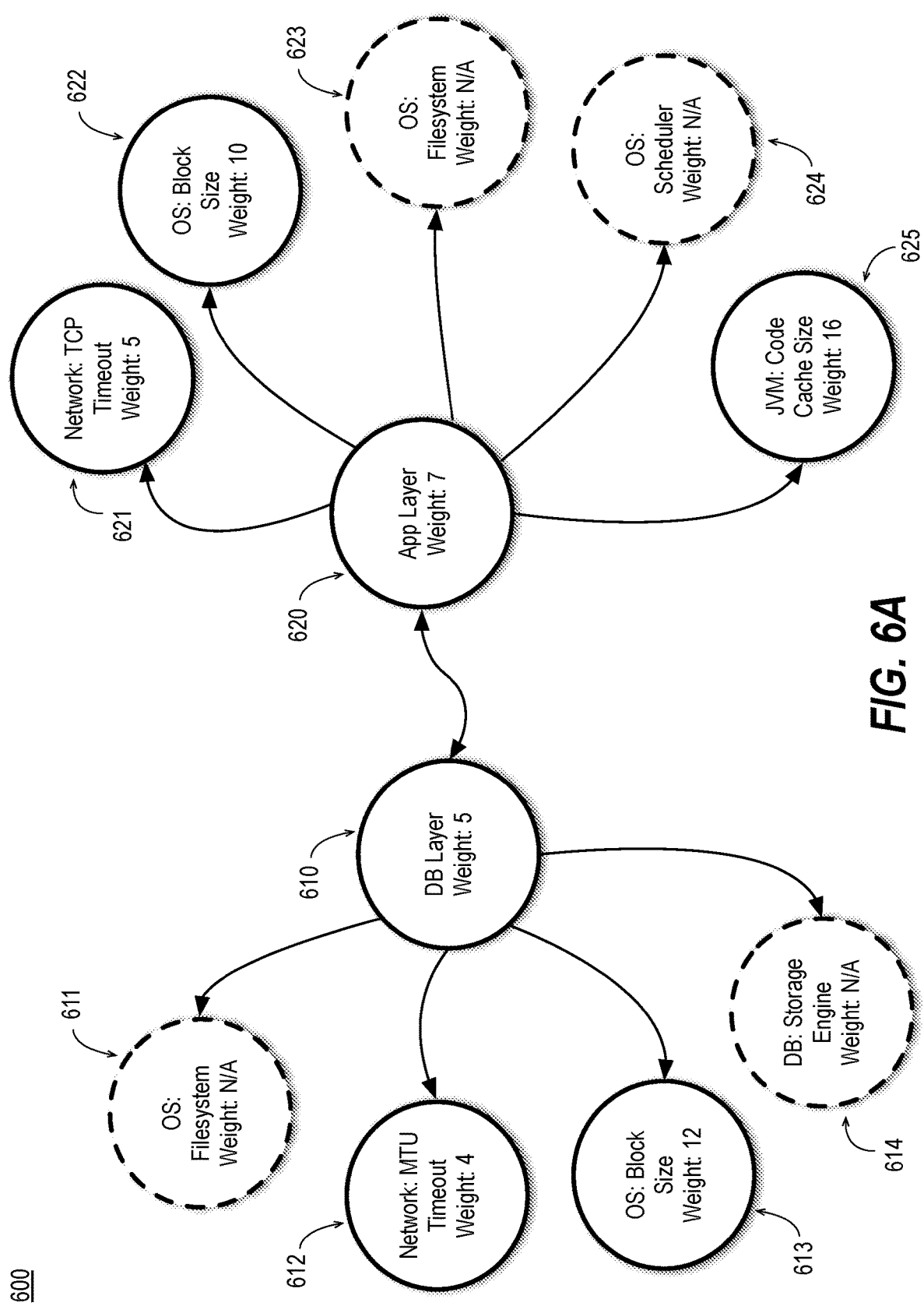
FIG. 6A is a block diagram illustrating an initial parameter graph in accordance with an embodiment.

At block 420, an initial acyclic dependency or configuration parameter graph is built. According to one embodiment, a subset of the information received at block 410 (e.g., the service definition for the service at issue for which configuration tuning is to be performed, including information regarding its layers and their respective configuration groups) is used to build the initial configuration parameter graph. In one embodiment, the initial configuration parameter graph is built by connecting each configuration group to its respective layer and connecting each layer to a layer, if any, that is dependent upon it. According to one embodiment, the use of the acyclic configuration parameter graph facilitates maintaining of the hierarchical structure of the multi-layer service and associated configuration groups so as to preserve the sequencing nature of the optimization iterations. For purposes of illustration, a simplified and non-limiting example of an initial configuration parameter graph is depicted in FIG. 6A.

According to one embodiment, at block 430, those of the configuration parameters that do not contribute sufficiently to the optimization goal are filtered out and no longer considered by subsequent processing blocks. Additionally, the state of the configuration parameter graph is updated to reflect the dropping of any configuration parameters by this parameter selection process. In one embodiment, this parameter selection process is as described above in connection with the parameter selection module 140 of FIG. 1 and with respect to FIGS. 2A and 2B. While this parameter selection processing is thought to be advantageous as it reduces the complexity of the subsequent optimization processing described further below, in alternative embodiments, the optimization processing can be performed without performing this parameter selection/filtering.

At block 440, an instance of the service is created within a test environment (e.g., target environment 170). According to one embodiment, an optimization module (e.g., optimizer 160) spawns an appropriate test environment based on the configuration groups associated with the layers of the service at issue (or those remaining after the optional parameter selection process of block 430). In one embodiment, the service may be run within the test environment in the form of a Pod. For example, the Pod may encapsulate the container of an application providing the service as well as associated resources and options. Depending upon the particular implementation, the test environment may be reconfigured as optimization processing locks down various aspects of the configuration or new testing environments may be spawned as with different updated configuration groups as it moves the environment toward the optimization goal(s).

At block 450, an iteration of hierarchical, bidirectional passing of parameter configurations through the service layers of the configuration parameter graph is performed. As noted above, the configuration representing the global maximum/minimum for the target performance metric is a subset of the set of configurations representing local maxima/minima agreed upon by the layers for the target performance metric. According to one embodiment, this process traverses the hierarchy of layers of the service at issue with reference to the current state of the parameter graph, starting at a selected layer of the hierarchy and performing a local optimization process at each layer seeking to identify a combination of local minima/maxima of configuration parameter values that for the layers that maximizes or minimizes as the case may be the target performance metric. As there may be many peaks and valleys in the fragmented differential plane resulting from the optimization being split among the layers, the maximum or minimum target performance metric identified by a single iteration is likely to represent a "false summit" or "false peak," which in mountaineering, refer to a peak that appears to be the pinnacle of the mountain but upon reaching it, it turns out the summit is higher. As such, in one embodiment, this process is repeated to evaluate other combinations of local minima/maxima of configuration parameter values agreed upon by the layers. An example of an iteration of hierarchical, bidirectional passing of parameter configurations through the service layers of the configuration parameter graph is described further below with reference to FIG. 5.

At block 460, a comparison is performed between the resulting value of the target performance metric for the current iteration with the prior iteration to identify a delta (change) in the value of the target performance metric from one iteration to another. According to one embodiment, the values of parameters for the various configurations tested as well as the resulting value of the target performance metric are stored in the telemetry database 130.

One difficulty associated with iteratively searching for the global minimum/maximum for a particular target metric is knowing when to stop. As such, in one embodiment, the optimization iteration of block 450 is repeated until a saturation point is reached in which no further improvement in the target performance metric is expected to be achieved. For example, a predetermined or configurable iteration threshold may be used to evaluate the change in the value of the target performance metric from one iteration to another and a predetermined or configurable number of consecutive iterations failing to improve the target performance metric (referred to herein as a saturation threshold as it is indicative of the optimization processing having reached a saturation point) can be used as a stopping condition.

At decision block 470, the change in the value of the target performance metric from one iteration to another is compared to the iteration threshold. If the delta is greater than the iteration threshold, then processing continues by looping back to block 450; otherwise, processing continues with block 480.

At block 480, the saturation run count is incremented to track the number of consecutive iterations for which the delta has remained stagnant.

At decision block 490, the saturation run count is compared to the saturation threshold. If the saturation run count is greater than the saturation threshold, then the configuration parameter optimization process is complete and the configuration represented by the current iteration represents the global maximum/minimum for the target performance metric; otherwise, processing continues by looping back to block 450.

While in the context of the present example, both an iteration threshold and a saturation threshold are used to determine when to stop the optimization processing, in alternative embodiments, the number of iterations performed can be used alone as a stopping condition. Those skilled in the art will appreciate that differential planes used to find maxima/minima for difference sets of configuration parameters will necessarily behave differently. As such, the various thresholds described herein should be set in accordance with the differential planes associated with the service at issue.

Iteration Processing

Figure 5:
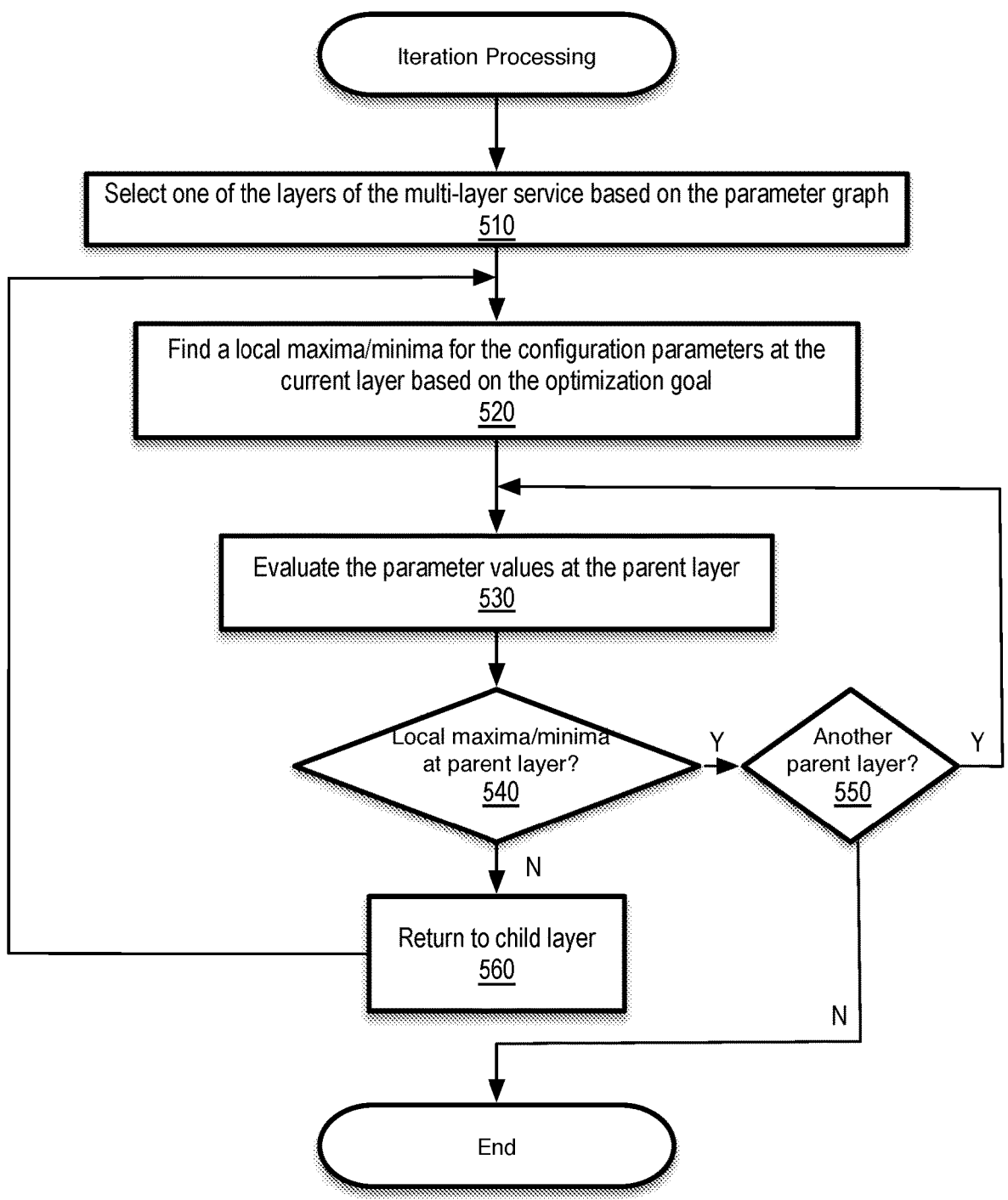
FIG. 5 is a flow diagram illustrating processing associated with a single iteration of a configuration parameter optimization process in accordance with an embodiment.

FIG. 5 is a flow diagram illustrating processing associated with a single iteration of a configuration parameter optimization process in accordance with an embodiment. As above, the processing described with reference to FIG. 5 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, this processing may be performed by one or more physical or virtual computer systems, such as computer system 900 illustrated in FIG. 9.

At block 510, one of the layers of the multi-layer service is selected within the current state of the parameter graph. According to one embodiment, in each iteration a different layer of the multi-layer service is selected. Alternatively, the service definition may specify a layer to be used as the starting point and the parameter graph links can be followed from there. In one embodiment, the node representing the starting point for the iteration processing is selected randomly and the parameter graph links can be followed from there. To the extent one or more nodes remain unexplored, a random jump may be made to an unexplored node.

At block 520, a configuration representing a local minima/maxima for the optimization goal is identified for the configuration parameters at the current layer (which is initially the layer selected at block 510).

At block 530, the parameter values associated with the configuration identified at block 520 are evaluated at the parent layer.

At decision block 540, it is determined whether the configuration also represents a local maxima/minima for the parent layer. If so, then processing branches to decision block 550; otherwise, processing continues with block 560.

At decision block 550, it is determined if there is another parent layer for which the configuration should be evaluated. If so, then processing continues with block 530; otherwise, this iteration is complete and the current configuration and the value of the target parameter are returned to the caller or otherwise logged. For example, in one embodiment, these values are stored in telemetry database 130.

While for purposes of clarity, the iteration processing described above with reference to FIG. 5 is not described in a recursive manner, those skilled in the art will appreciate a recursive algorithm may be used to implement, the above-described iteration processing.

Configuration Parameter Tuning Example

FIG. 6A is a block diagram illustrating an initial parameter graph 600 in accordance with an embodiment. In the context of the present example, it is assumed the multi-layer service for which configuration parameter values are to be optimized includes two layers, a database (DB) layer 610 and an application (App) layer 620. The DB layer 610 has an associated configuration group including an operating system configuration parameter relating to the filesystem 611, a network configuration parameter relating to MTU 612, an operating system configuration parameter relating to block size 613, and a DB configuration parameter relating to the storage engine 614. The App layer 620 has an associated configuration group including a network configuration parameter relating to a TCP timeout 621, an operating system configuration parameter relating to block size 622, an operating system configuration parameter relating to the filesystem 623, an operating system configuration parameter relating to the scheduler 624, and a JVM configuration parameter relating to code cache size 625. Based on their respective contributions to the specified optimization goal, as determined by running various tests on the parameter hyperplane as discussed above, for example, weights have been assigned to the nodes. In this example, the nodes with dashed outlines (i.e., nodes 611, 614, 623, and 624) have been determined by the parameter selection process not to meet a configurable threshold level of contribution to the optimization goal. As such in FIG. 6B, which represents the parameter graph of FIG. 6A after parameter selection has been performed in accordance with an embodiment, nodes 611, 614, 623, and 624 are no longer part of the parameter graph as they have been filtered out so as to improve the efficiency of the subsequent optimization processing.

Figure 6B:
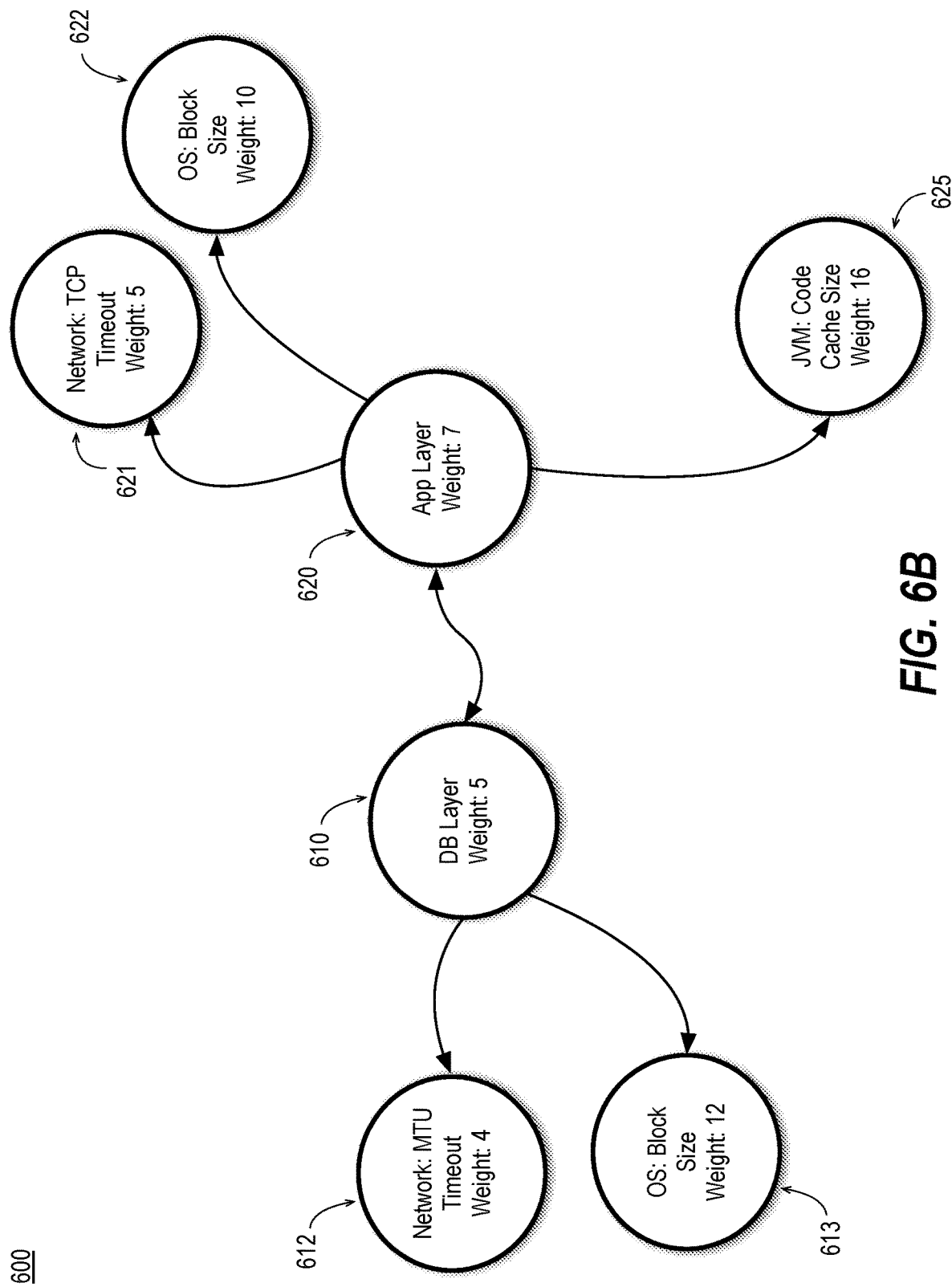
FIG. 6B is a block diagram illustrating the parameter graph of FIG. 6A after parameter selection is performed in accordance with an embodiment.
Figure 6C:
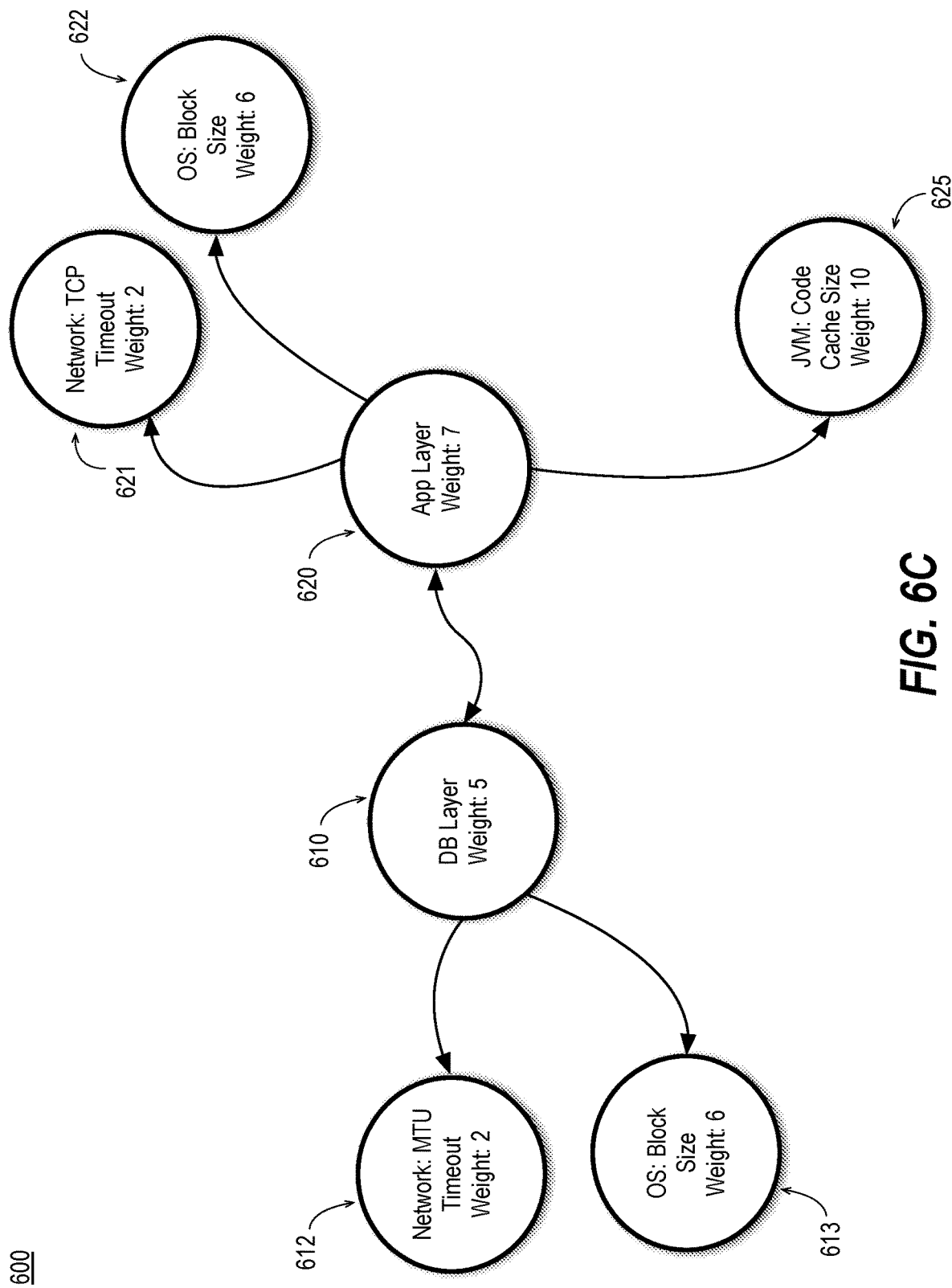
FIG. 6C is a block diagram illustrating the parameter graph of FIG. 6B after local optimizations have been performed in accordance with an embodiment.

FIG. 6C is a block diagram illustrating the parameter graph of FIG. 6B after local optimizations have been performed in accordance with an embodiment. In the context of this example, as a result of local optimization processing performed at nodes 610 and 620 the weights associated with nodes 612, 613, 621, 622 and 625 have been updated.

Figure 6D:
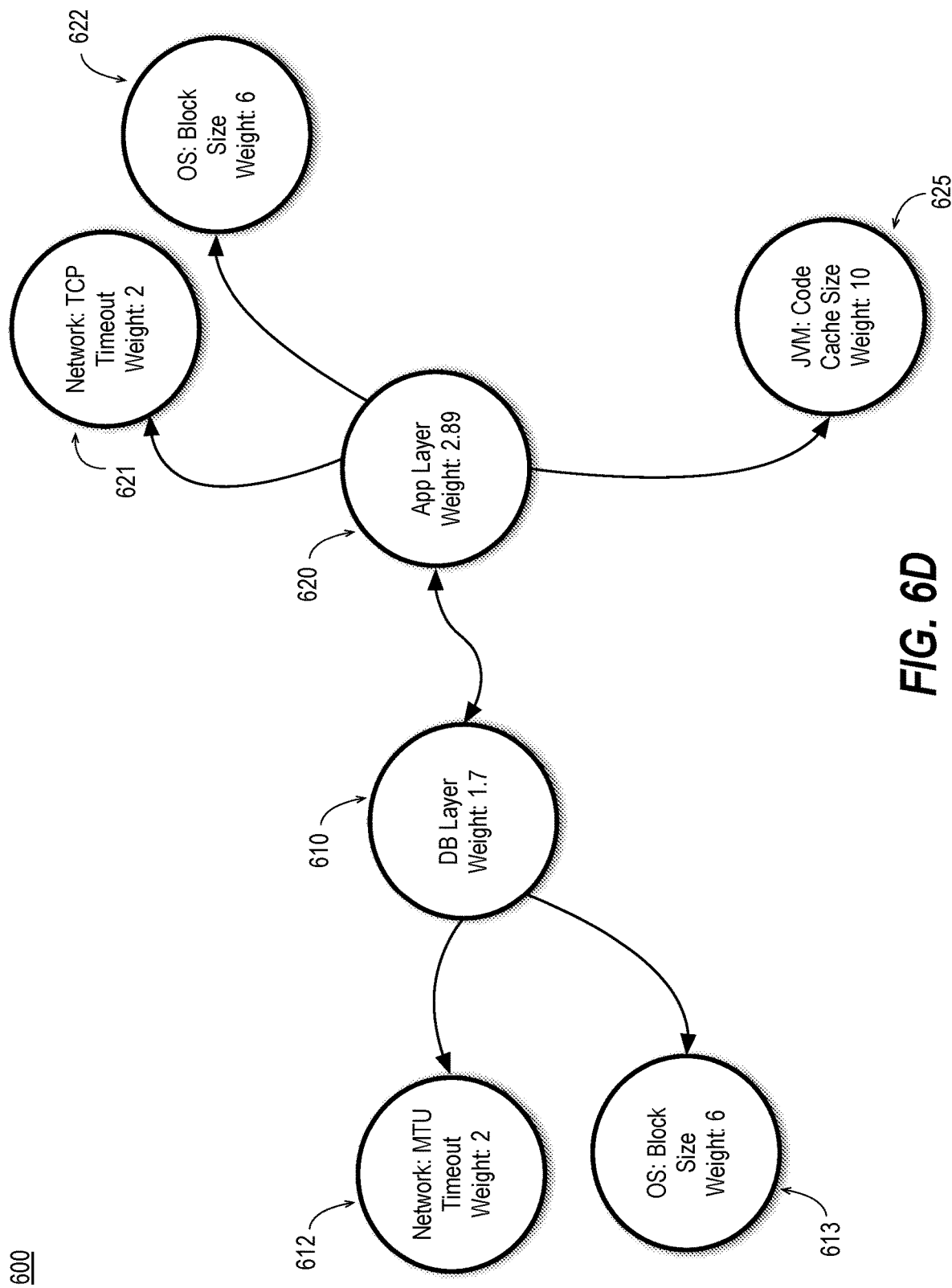
FIG. 6D is a block diagram illustrating the parameter graph of FIG. 6C after global optimization has been completed in accordance with an embodiment.

FIG. 6D is a block diagram illustrating the parameter graph of FIG. 6C after global optimization has been completed in accordance with an embodiment. In the context of this example, upon identifying a global maximum/minimum for the target performance metric, the weights associated with nodes 610 and 620 are updated.

Example Service Environment

Figure 7:
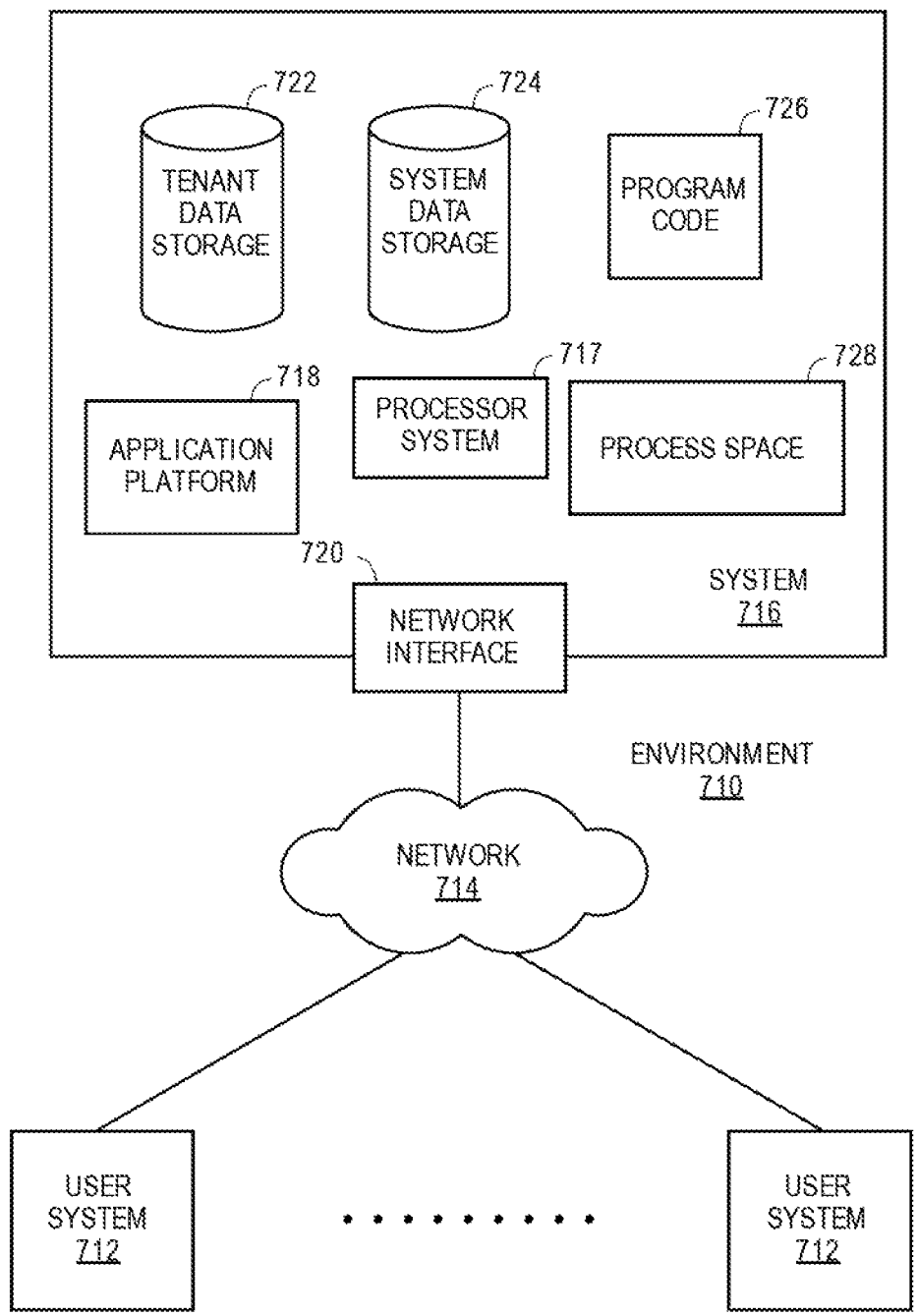
FIGS. 7 and 8 are block diagrams of an environment in which an on-demand database service might be used.

FIG. 7 illustrates a block diagram of an environment 710 wherein an on-demand database service might be used. Environment 710 may include user systems 712, network 714, system 716, processor system 717, application platform 718, network interface 720, tenant data storage 722, system data storage 724, program code 726, and process space 728. In other embodiments, environment 710 may not have all of the components listed and/or may have other elements instead of, or in addition to, those listed above.

Environment 710 is an environment in which an on-demand database service exists. User system 712 may be any machine or system that is used by a user to access a database user system. For example, any of user systems 712 can be a handheld computing device, a mobile phone, a laptop computer, a work station, and/or a network of computing devices. As illustrated in herein FIG. 7 (and in more detail in FIG. 8) user systems 712 might interact via a network 714 with an on-demand database service, which is system 716.

An on-demand database service, such as system 716, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 716" and "system 716" will be used interchangeably herein. A database image may include one or more database objects. A relational database management system (RDMS) or the equivalent may execute storage and retrieval of information against the database object(s). Application platform 718 may be a framework that allows the applications of system 716 to run, such as the hardware and/or software, e.g., the operating system. In an embodiment, on-demand database service 716 may include an application platform 718 that enables creation, managing and executing one or more applications developed by the provider of the on-demand database service, users accessing the on-demand database service via user systems 712, or third party application developers accessing the on-demand database service via user systems 712.

The users of user systems 712 may differ in their respective capacities, and the capacity of a particular user system 712 might be entirely determined by permissions (permission levels) for the current user. For example, where a salesperson is using a particular user system 712 to interact with system 716, that user system has the capacities allotted to that salesperson. However, while an administrator is using that user system to interact with system 716, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 714 is any network or combination of networks of devices that communicate with one another. For example, network 714 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 712 might communicate with system 716 using TCP/IP and, at a higher network level, use other common Internet protocols to communicate, such as HTTP, FTP, AFS, WAP, etc. In an example where HTTP is used, user system 712 might include an HTTP client commonly referred to as a "browser" for sending and receiving HTTP messages to and from an HTTP server at system 716. Such an HTTP server might be implemented as the sole network interface between system 716 and network 714, but other techniques might be used as well or instead. In some implementations, the interface between system 716 and network 714 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 716, shown in FIG. 7, implements a web-based customer relationship management (CRM) system. For example, in one embodiment, system 716 includes application servers configured to implement and execute CRM software applications as well as provide related data, code, forms, webpages and other information to and from user systems 712 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 716 implements applications other than, or in addition to, a CRM application. For example, system 716 may provide tenant access to multiple hosted (standard and custom) applications, including a CRM application. User (or third party developer) applications, which may or may not include CRM, may be supported by the application platform 718, which manages creation, storage of the applications into one or more database objects and executing of the applications in a virtual machine in the process space of the system 716.

One arrangement for elements of system 716 is shown in FIG. 7, including a network interface 720, application platform 718, tenant data storage 722 for tenant data 723, system data storage 724 for system data 725 accessible to system 716 and possibly multiple tenants, program code 726 for implementing various functions of system 716, and a process space 728 for executing MTS system processes and tenant-specific processes, such as running applications as part of an application hosting service. Additional processes that may execute on system 716 include database indexing processes.

Several elements in the system shown in FIG. 7 include conventional, well-known elements that are explained only briefly here. For example, each user system 712 could include a desktop personal computer, workstation, laptop, PDA, cell phone, or any wireless access protocol (WAP) enabled device or any other computing device capable of interfacing directly or indirectly to the Internet or other network connection. User system 712 typically runs an HTTP client, e.g., a browsing program, such as Edge from Microsoft, Safari from Apple, Chrome from Google, or a WAP-enabled browser in the case of a cell phone, PDA or other wireless device, or the like, allowing a user (e.g., subscriber of the multi-tenant database system) of user system 712 to access, process and view information, pages and applications available to it from system 716 over network 714. Each user system 712 also typically includes one or more user interface devices, such as a keyboard, a mouse, touch pad, touch screen, pen or the like, for interacting with a graphical user interface (GUI) provided by the browser on a display (e.g., a monitor screen, LCD display, etc.) in conjunction with pages, forms, applications and other information provided by system 716 or other systems or servers. For example, the user interface device can be used to access data and applications hosted by system 716, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 712 and all of its components are operator configurable using applications, such as a browser, including computer code run using a central processing unit such as an Intel Core series processor or the like. Similarly, system 716 (and additional instances of an MTS, where more than one is present) and all of their components might be operator configurable using application(s) including computer code to run using a central processing unit such as processor system 717, which may include an Intel Core series processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 716 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 716 is configured to provide webpages, forms, applications, data and media content to user (client) systems 712 to support the access by user systems 712 as tenants of system 716. As such, system 716 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 8:
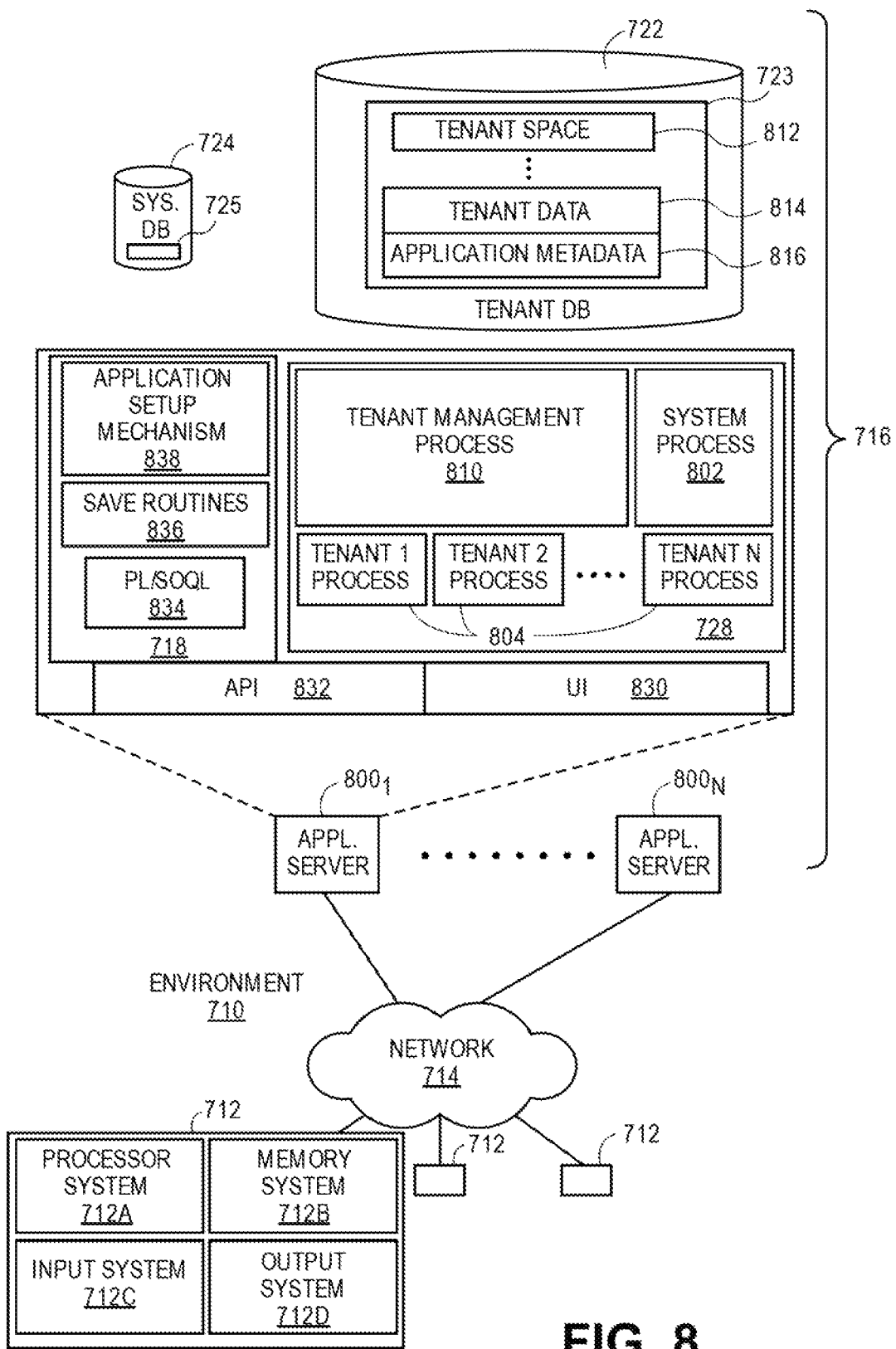

FIG. 8 also illustrates environment 710. However, in FIG. 8 elements of system 716 and various interconnections in an embodiment are further illustrated. FIG. 8 shows that user system 712 may include processor system 712A, memory system 712B, input system 712C, and output system 712D. FIG. 8 shows network 714 and system 716. FIG. 8 also shows that system 716 may include tenant data storage 722, tenant data 723, system data storage 724, system data 725, User Interface (UI) 830, Application Program Interface (API) 832, PL/SOQL 834, save routines 836, application setup mechanism 838, applications servers $800_1$-$800_N$, system process space 802, tenant process spaces 804, tenant management process space 810, tenant storage area 812, user storage 814, and application metadata 816. In other embodiments, environment 710 may not have the same elements as those listed above and/or may have other elements instead of, or in addition to, those listed above.

User system 712, network 714, system 716, tenant data storage 722, and system data storage 724 were discussed above in FIG. 7. Regarding user system 712, processor system 712A may be any combination of one or more processors. Memory system 712B may be any combination of one or more memory devices, short term, and/or long term memory. Input system 712C may be any combination of input devices, such as one or more keyboards, mice, trackballs, scanners, cameras, and/or interfaces to networks. Output system 712D may be any combination of output devices, such as one or more monitors, printers, and/or interfaces to networks. As shown by FIG. 8, system 716 may include a network interface 720 (of FIG. 7) implemented as a set of HTTP application servers 800, an application platform 718, tenant data storage 722, and system data storage 724. Also shown is system process space 802, including individual tenant process spaces 804 and a tenant management process space 810. Each application server 800 may be configured to tenant data storage 722 and the tenant data 723 therein, and system data storage 724 and the system data 725 therein to serve requests of user systems 712. The tenant data 723 might be divided into individual tenant storage areas 812, which can be either a physical arrangement and/or a logical arrangement of data. Within each tenant storage area 812, user storage 814 and application metadata 816 might be similarly allocated for each user. For example, a copy of a user's most recently used (MRU) items might be stored to user storage 814. Similarly, a copy of MRU items for an entire organization that is a tenant might be stored to tenant storage area 812. A UI 830 provides a user interface and an API 832 provides an application programmer interface to system 716 resident processes to users and/or developers at user systems 712. The tenant data and the system data may be stored in various databases, such as one or more Oracle™ databases.

Application platform 718 includes an application setup mechanism 838 that supports application developers' creation and management of applications, which may be saved as metadata into tenant data storage 722 by save routines 836 for execution by subscribers as one or more tenant process spaces 804 managed by tenant management process 810 for example. Invocations to such applications may be coded using PL/SOQL 834 that provides a programming language style interface extension to API 832. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service," issued Jun. 1, 2010 to Craig Weissman, which is incorporated in its entirety herein for all purposes. Invocations to applications may be detected by one or more system processes, which manage retrieving application metadata 816 for the subscriber making the invocation and executing the metadata as an application in a virtual machine.

Each application server 800 may be communicably coupled to database systems, e.g., having access to system data 725 and tenant data 723, via a different network connection. For example, one application server $800_1$ might be coupled via the network 714 (e.g., the Internet), another application server $800_{N-1}$ might be coupled via a direct network link, and another application server $800_N$ might be coupled by yet a different network connection. Transfer Control Protocol and Internet Protocol (TCP/IP) are typical protocols for communicating between application servers 800 and the database system. However, it will be apparent to one skilled in the art that other transport protocols may be used to optimize the system depending on the network interconnect used.

In certain embodiments, each application server 800 is configured to handle requests for any user associated with any organization that is a tenant. Because it is desirable to be able to add and remove application servers from the server pool at any time for any reason, there is preferably no server affinity for a user and/or organization to a specific application server 800. In one embodiment, therefore, an interface system implementing a load balancing function (e.g., an F5 BIG-IP load balancer) is communicably coupled between the application servers 800 and the user systems 712 to distribute requests to the application servers 800. In one embodiment, the load balancer uses a least connections algorithm to route user requests to the application servers 800. Other examples of load balancing algorithms, such as round robin and observed response time, also can be used. For example, in certain embodiments, three consecutive requests from the same user could hit three different application servers 800, and three requests from different users could hit the same application server 800. In this manner, system 716 is multi-tenant, wherein system 716 handles storage of, and access to, different objects, data and applications across disparate users and organizations.

As an example of storage, one tenant might be a company that employs a sales force where each salesperson uses system 716 to manage their sales process. Thus, a user might maintain contact data, leads data, customer follow-up data, performance data, goals and progress data, etc., all applicable to that user's personal sales process (e.g., in tenant data storage 722). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 716 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 716 might also maintain system level data usable by multiple tenants or other data. Such system level data might include industry reports, news, postings, and the like that are sharable among tenants.

In certain embodiments, user systems 712 (which may be client systems) communicate with application servers 800 to request and update system-level and tenant-level data from system 716 that may require sending one or more queries to tenant data storage 722 and/or system data storage 724. System 716 (e.g., an application server 800 in system 716) automatically generates one or more SQL statements (e.g., one or more SQL queries) that are designed to access the desired information. System data storage 724 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Embodiments described herein include various steps, examples of which have been described above. As described further below, these steps may be performed by hardware components or may be embodied in machine-executable instructions, which may be used to cause a general-purpose or special-purpose processor programmed with the instructions to perform the steps. Alternatively, at least some steps may be performed by a combination of hardware, software, and/or firmware.

Embodiments described herein may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to example embodiments described herein with appropriate standard computer hardware to execute the code contained therein. An apparatus for practicing various example embodiments described herein may involve one or more computing elements or computers (or one or more processors within a single computer) and storage systems containing or having network access to computer program(s) coded in accordance with various methods described herein, and the method steps of various example embodiments described herein may be accomplished by modules, routines, subroutines, or subparts of a computer program product.

Example Computer System

Figure 9:
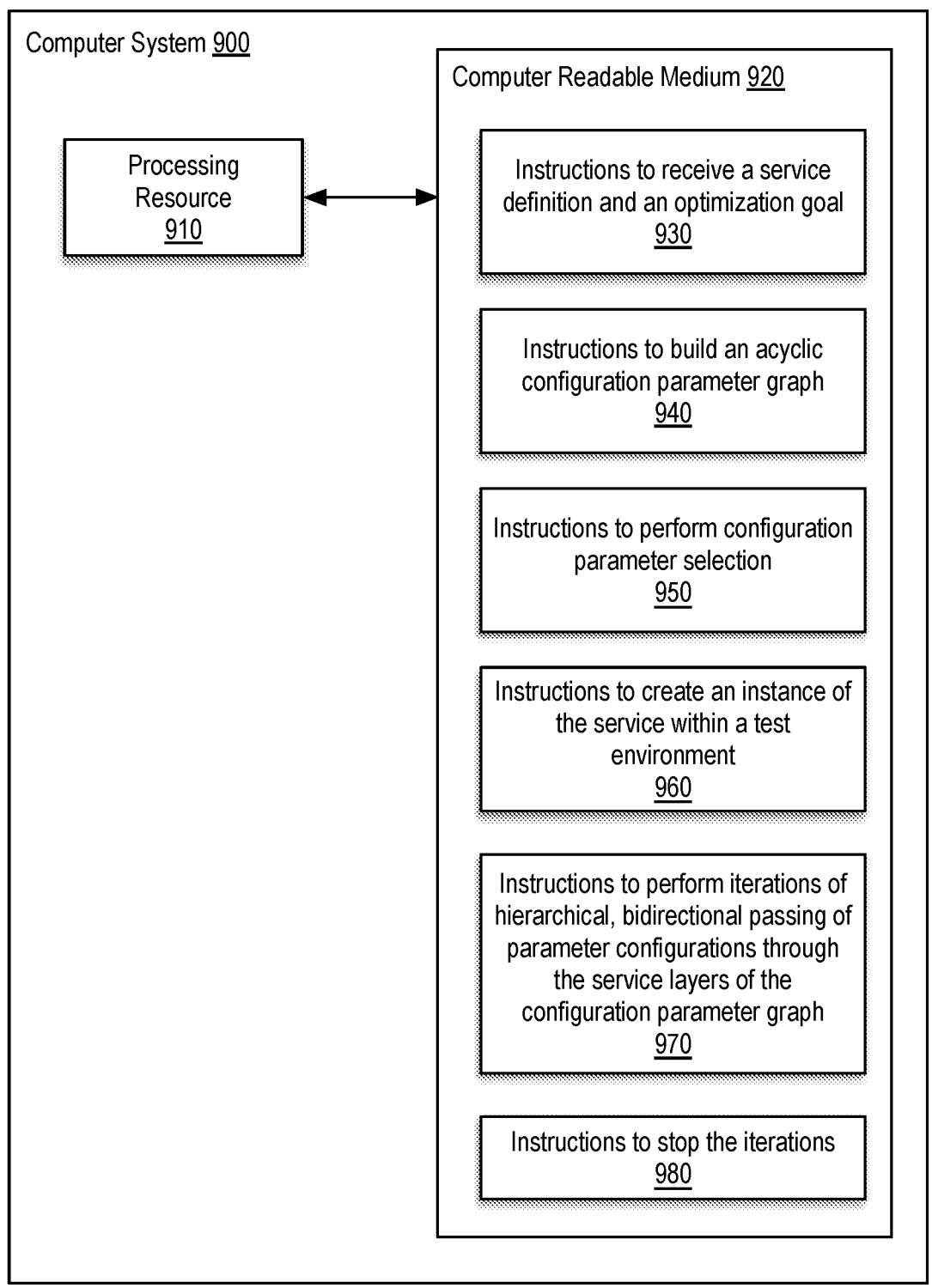
FIG. 9 is a block diagram of a computer system that may be part of a computing environment in which service tuning processing may be performed in in accordance with an embodiment.

FIG. 9 is a block diagram of a computer system in accordance with an embodiment. In the example illustrated by FIG. 9, computer system 900 includes a processing resource 910 coupled to a non-transitory, machine readable medium 920 encoded with instructions to tune configuration parameters of a multi-layer service in accordance with an embodiment. The processing resource 910 may include a microcontroller, a microprocessor, central processing unit core(s), an ASIC, an FPGA, and/or other hardware device suitable for retrieval and/or execution of instructions from the machine readable medium 920 to perform the functions related to various examples described herein. Additionally or alternatively, the processing resource 910 may include electronic circuitry for performing the functionality of the instructions described herein.

The machine readable medium 920 may be any medium suitable for storing executable instructions. Non-limiting examples of machine readable medium 920 include RAM, ROM, EEPROM, flash memory, a hard disk drive, an optical disc, or the like. The machine readable medium 920 may be disposed within the computer system 900, as shown in FIG. 9, in which case the executable instructions may be deemed "installed" or "embedded" on the computer system 900. Alternatively, the machine readable medium 920 may be a portable (e.g., external) storage medium, and may be part of an "installation package." The instructions stored on the machine readable medium 920 may be useful for implementing at least part of the methods described herein.

In the context of the present example, the machine readable medium 920 is encoded with a set of executable instructions 930-980. It should be understood that part or all of the executable instructions and/or electronic circuits included within one block may, in alternate implementations, be included in a different block shown in the figures or in a different block not shown.

Instructions 930, upon execution, cause the processing resource 910 to receive a service definition and an optimization goal. In one embodiment, instructions 930 may correspond generally to instructions for performing block 410 of FIG. 4.

Instructions 940, upon execution, cause the processing resource 910 to build an acyclic configuration parameter graph. In one embodiment, instructions 940 may correspond generally to instructions for performing block 420 of FIG. 4.

Instructions 950, upon execution, cause the processing resource 910 to perform optional parameter selection/filtering. In one embodiment, instructions 950 may correspond generally to instructions for performing block 430 of FIG. 4.

Instructions 960, upon execution, cause the processing resource 910 to create an instance of the service within a test environment. In one embodiment, instructions 960 may correspond generally to instructions for performing block 440 of FIG. 4.

Instructions 970, upon execution, cause the processing resource 910 to perform iterations of hierarchical, bidirectional passing of parameter configurations through the service layers of the configuration parameter graph. In one embodiment, instructions 970 may correspond generally to instructions for performing block 450 of FIG. 4.

Instructions 980, upon execution, cause the processing resource 910 to stop the iterations being performed by instructions 970. In one embodiment, instructions 980 may correspond generally to instructions for performing blocks 460-490 of FIG. 4.

In the foregoing description, numerous details are set forth to provide an understanding of the subject matter disclosed herein. However, implementation may be practiced without some or all of these details. Other implementations may include modifications and variations from the details discussed above. It is intended that the following claims cover such modifications and variations.

What is claimed is:

1. A computer-implemented method comprising:
   receiving, by an optimization process running on one or more computer systems, a service definition and optimization criteria for tuning a configuration of a service for a particular production environment, wherein the service definition includes information regarding a plurality of layers of the service and corresponding configuration groups, each configuration group including configuration parameters for a corresponding layer of the service and for which values are configurable;
   creating, by the optimization process, an acyclic dependency graph including a plurality of nodes, wherein a node represents a layer in the plurality of layers, the acyclic dependency graph representing configuration groups passed between the plurality of layers and representing a hierarchical relationship between the plurality of layers of the service; and
   globally optimizing, by an optimization process running on the one or more computer systems, values of configuration parameters of the configuration groups by:
   creating an instance of the service based on the service definition; and
   performing a local optimization process based on the optimization criteria at each layer of the plurality of layers of the instance of the service by locally optimizing values of configuration parameters associated with a particular layer in the plurality of layers for a first node before passing the optimized values of configuration parameters for the first node on to a parent node associated with a parent layer in the plurality of layers as defined by the acyclic dependency graph and propagating respective optimized values for respective nodes that are associated with respective layers through the nodes of the dependency graph.

2. The method of claim 1, wherein the optimization criteria specify an optimization goal for the service in terms of a target performance metric of the service.

3. The method of claim 1, further comprising, prior to the globally optimizing, limiting, by a parameter selection process running on the one or more computer systems, the configuration parameters to those configuration parameters represented within the corresponding configuration groups that have a particular level of an impact on the optimization goal for the service.

4. The method of claim 3, wherein the limiting includes subjecting the configuration parameters to statistical analysis.

5. The method of claim 3, wherein the limiting comprises:
   for each layer of the plurality of layers of the service and a configuration group of the corresponding configuration groups corresponding to the layer, reducing, by the parameter selection process, an exploration search space in which to find a minima or maxima of a hyperplane defined by a subset of the configuration parameters of the configuration group by filtering out those of the subset of the configuration parameters that do not make an impact on the optimization goal.

6. The method of claim 1, wherein the plurality of layers includes one or more of: an application layer, a database layer, or a search layer.

7. The method of claim 1, wherein the corresponding configuration groups include a set of operating system configuration parameters, a set of network configuration parameters, and a set of Java virtual machine (JVM) parameters.

8. The method of claim 1, further comprising iteratively performing the local optimization process through at least a portion of the nodes of the dependency graph until a stopping condition is achieved.

9. The method of claim 8, wherein the stopping condition is achieved if there is no change to a resulting value of a performance metric specified by the optimization criteria from one iteration to another for a predefined or configurable number of iterations of the local optimization process.

10. A non-transitory machine readable medium storing instructions executable by a processing resource of a computer system, the non-transitory machine readable medium comprising instructions configurable to cause the processing resource to:
    process a service definition and optimization criteria for tuning a configuration of a service for a particular production environment, wherein the service definition includes information regarding a plurality of layers of the service and corresponding configuration groups, each configuration group including configuration parameters for a corresponding layer of the service and for which values are configurable;
    limit the configuration parameters to those configuration parameters represented within the corresponding configuration groups that have a particular level of an impact on an optimization goal for the service;
    create an acyclic dependency graph including a plurality of nodes, wherein a node represents a layer in the plurality of layers, the acyclic dependency graph representing the corresponding configuration groups passed between the plurality of layers and representing a hierarchical relationship between the plurality of layers of the service; and
    globally optimize values of configuration parameters of the corresponding configuration groups by:
    creating an instance of the service based on the service definition; and
    performing a local optimization process based on the optimization criteria at each layer of the plurality of layers of the instance of the service by locally optimizing values of configuration parameters associated with a particular layer in the plurality of layers for a first node before passing the optimized values of configuration parameters for the first node on to a parent node associated with a parent layer in the plurality of layers as defined by the acyclic dependency graph and propagating respective optimized values for respective nodes that are associated with respective layers through the nodes of the dependency graph.

11. The non-transitory machine readable medium of claim 10, wherein the configuration parameters are limited by subjecting the configuration parameters to statistical analysis.

12. The non-transitory machine readable medium of claim 10, wherein the instructions are further configurable to cause the processing resource to: for each layer of the plurality of layers of the service and a configuration group of the corresponding configuration groups corresponding to the layer, reduce an exploration search space in which to find a minima or maxima of a hyperplane defined by a subset of the configuration parameters of the configuration group by filtering out those of the subset of the configuration parameters that do not make an impact on the optimization goal.

13. The non-transitory machine readable medium of claim 10, wherein the plurality of layers include one or more of: an application layer, a database layer, or a search layer.

14. The non-transitory machine readable medium of claim 10, wherein the corresponding configuration groups include a set of operating system configuration parameters, a set of network configuration parameters, and a set of Java virtual machine (JVM) parameter.

15. The non-transitory machine readable medium of claim 10, wherein the instructions are further configurable to cause the processing resource to iteratively perform the local optimization process through at least a portion of the nodes of the dependency graph until a stopping condition is achieved.

16. The non-transitory machine readable medium of claim 15, wherein the stopping condition is achieved if there is no change to a resulting value of a performance metric specified by the optimization criteria from one iteration to another for a predefined or configurable number of iterations of the local optimization process.

17. A system comprising:
a processing resource;
a non-transitory computer-readable medium, coupled to the processing resource, having stored therein instructions that are configurable to cause the processing resource to:
process a service definition and optimization criteria for tuning a configuration of a service for a particular production environment, wherein the service definition includes information regarding a plurality of layers of the service and corresponding configuration groups, each configuration group including configuration parameters for a corresponding layer of the service and for which values are configurable;
limit the configuration parameters to those configuration parameters represented within the corresponding configuration groups that have a particular level of an impact on an optimization goal for the service;
create an acyclic dependency graph including a plurality of nodes, wherein a node represents a layer in the plurality of layers, the acyclic dependency graph representing configuration groups passed between the plurality of layers and representing a hierarchical relationship between the plurality of layers of the service; and
globally optimize values of configuration parameters of the configuration groups by:
creating an instance of the service based on the service definition; and
until a stopping condition is achieved, iteratively performing a local optimization process based on the optimization criteria at each layer of the plurality of layers of the instance of the service by locally optimizing value of configuration parameters associated with a particular layer in the plurality of layers for a first node before passing the optimized values of configuration parameters for the first node on to a parent node associated with a parent layer in the plurality of layers as defined by the acyclic dependency graph and propagating respective optimized values for respective nodes that are associated with respective layers through the nodes of the dependency graph.

18. The system of claim 17, wherein the stopping condition is achieved if there is no change to a resulting value of a target performance metric specified by the optimization criteria from one iteration to another for a predefined or configurable number of iterations of the local optimization process.

19. The system of claim 17, wherein the configuration parameters are limited by subjecting the configuration parameters to statistical analysis.

20. The system of claim 17, wherein the instructions configurable to cause the processing resource to for each layer of the plurality of layers of the service and a configuration group of the corresponding configuration groups corresponding to the layer, reduce an exploration search space in which to find a minima or maxima of a hyperplane defined by a subset of the configuration parameters of the configuration group by filtering out those of the subset of the configuration parameters that do not make an impact on the optimization goal.

* * * * *